US010387731B2

United States Patent
Bailer et al.

(10) Patent No.: US 10,387,731 B2
(45) Date of Patent: Aug. 20, 2019

(54) SYSTEMS AND METHODS FOR EXTRACTING AND MATCHING DESCRIPTORS FROM DATA STRUCTURES DESCRIBING AN IMAGE SEQUENCE

(71) Applicant: Joanneum Research Forschungsgesellschaft mbH, Graz (AT)

(72) Inventors: Werner Bailer, Grafenbach (AT); Stefanie Wechtitsch, Graz (AT)

(73) Assignee: Joanneum Research Forschungsgesellschaft mbH (AT)

( * ) Notice: Subject to any disclaimer, the term of this patent is extended or adjusted under 35 U.S.C. 154(b) by 87 days.

(21) Appl. No.: 15/499,724

(22) Filed: Apr. 27, 2017

(65) Prior Publication Data

US 2017/0316269 A1 Nov. 2, 2017

(30) Foreign Application Priority Data

Apr. 28, 2016 (EP) .................................... 16167518

(51) Int. Cl.
*G06K 9/00* (2006.01)
*G06K 9/62* (2006.01)
(Continued)

(52) U.S. Cl.
CPC ......... *G06K 9/00744* (2013.01); *G06F 16/71* (2019.01); *G06F 16/783* (2019.01);
(Continued)

(58) Field of Classification Search
CPC .... G06F 12/023; G06F 12/0802; G06F 13/28; G06F 17/30858; G06F 2212/401
(Continued)

(56) References Cited

U.S. PATENT DOCUMENTS

| 7,532,804 B2 | 5/2009 | Kim | |
|---|---|---|---|
| 8,006,186 B2 * | 8/2011 | Kellock | G11B 27/34 715/721 |
| 9,131,163 B2 | 9/2015 | Pau et al. | |

FOREIGN PATENT DOCUMENTS

| EP | 1147655 B1 | 10/2011 |
|---|---|---|
| WO | 2009129243 A1 | 10/2009 |

(Continued)

OTHER PUBLICATIONS

Extended European Search Report for European Application No. 16167518.6, Search completed Feb. 2, 2017, dated Feb. 9, 2017, 9 Pgs.
(Continued)

*Primary Examiner* — Charlotte M Baker
(74) *Attorney, Agent, or Firm* — KPPB LLP

(57) ABSTRACT

A compact image sequence descriptor (101), used for describing an image sequence, comprises a segment global descriptor (113) for at least one segment within the sequence, which includes global descriptor information for respective images, relating to interest points within the video content of the images. The segment global descriptor (113) includes a base descriptor (121), which is a global descriptor associated with a representative frame (120) of the image sequence, and a number of relative descriptors (125). The relative descriptors contain information of a respective global descriptor relative to the base descriptor allowing to reconstruct an exact or approximated global descriptor associated with a respective image of the image sequence. The image sequence descriptor (101) may further include a segment local descriptor (114) for a segment, comprising a set of encoded local feature descriptors.

21 Claims, 4 Drawing Sheets

(51) Int. Cl.
G06K 9/46 (2006.01)
G06F 16/783 (2019.01)
G06F 16/71 (2019.01)

(52) U.S. Cl.
CPC ..... *G06K 9/00751* (2013.01); *G06K 9/00758* (2013.01); *G06K 9/00765* (2013.01); *G06K 9/4671* (2013.01); *G06K 9/6215* (2013.01)

(58) Field of Classification Search
USPC ............... 382/103, 190, 154, 302, 236, 238; 375/240.08, 240.17; 348/699, 65; 600/407; 715/728, 721, 723, 726
See application file for complete search history.

(56) References Cited

FOREIGN PATENT DOCUMENTS

| WO | 2010055399 A1 | 5/2010 |
|---|---|---|
| WO | 2013076365 A1 | 5/2013 |
| WO | 2013102574 A1 | 7/2013 |
| WO | 2014009490 A1 | 1/2014 |
| WO | 2015011185 A1 | 1/2015 |

OTHER PUBLICATIONS

Arandjelovic et al., "All about VLAD", 2013 IEEE Conference on Computer Vision and Pattern Recognition, Jun. 23-28, 2013, Portland, OR, USA, pp. 1578-1585, DOI: 10.1109/CVPR.2013.207.

Donahue et al., "DeCAF: A Deep Convolutional Activation Feature for Generic Visual Recognition", Proceedings of the 31st International Conference on Machine, Learning, 2014, Beijing, China, 9 pgs.

Gull et al., "A Clustering Technique for Video Copy Detection", Pattern Recognition and Image Analysis, Springer, Berlin, Heidelberg, vol. 4477, Jun. 6, 2007, pp. 451-458, DOI: https://doi.org/10.1007/978-3-540-72847-4_58.

Jégou et al., "Aggregating local descriptors into a compact image representation", 2010 IEEE Computer Society Conference on Computer Vision and Pattern Recognition, Jun. 13-18, 2010, San Francisco, CA, USA, pp. 3304-3311, DOI: 10.1109/CVPR.2010.5540039.

Jégou et al., "Packing bag-of-features", 2009 IEEE 12th International Conference on Computer Vision, Sep. 29-Oct. 2, 2009, Kyoto, Japan, pp. 2357-2364, DOI: 10.1109/ICCV.2009.5459419.

Kobla et al, "Indexing and Retrieval of the Mpeg Compressed Video", Journal of Electronic Imaging, Apr. 1, 1998, vol. 7, No. 2, pp. 294-307, https://doi.org/10.1117/1.482645.

Lin et al., "Robust fisher codes for large scale image retrieval", 2013 IEEE International Conference on Acoustics, Speech and Signal Processing, Vancouver, BC, Canada, May 26-31, 2013, pp. 1513-1517, DOI: 10.1109/ICASSP.2013.6637904.

Pennebaker et al., "An overview of the basic principles of the Q-Coder adaptive binary arithmetic coder", IBM Journal of Research and Development, Nov. 1988, vol. 32, No. 6, pp. 717-726, DOI: 10.1147/rd.326.0717.

Perronnin et al., "Fisher Kernels on Visual Vocabularies for Image Categorization", 2007 IEEE Conference on Computer Vision and Pattern Recognition, Jun. 17-22, 2007, pp. 1-8, http://doi.ieeecomputersociety.org/10.1109/CVPR.2007.383266.

Picard et al., "Improving image similarity with vectors of locally aggregated tensors", 2011 18th IEEE International Conference on Image Processing, Sep. 11-14, 2011, Brussels, Belgium, pp. 669-672, DOI: 10.1109/ICIP.2011.6116641.

Rublee et al., "ORB: An efficient alternative to SIFT or SURF", 2011 International Conference on Computer Vision, Nov. 6-13, 2011, Barcelona, Spain, pp. 2564-2571, DOI: 10.1109/ICCV.2011.6126544.

Schmid et al., "Local grayvalue invariants for image retrieval", IEEE Transactions on Pattern Analysis and Machine Intelligence, May 1997, vol. 19, No. 5, pp. 530-535, DOI: 10.1109/34.589215.

* cited by examiner

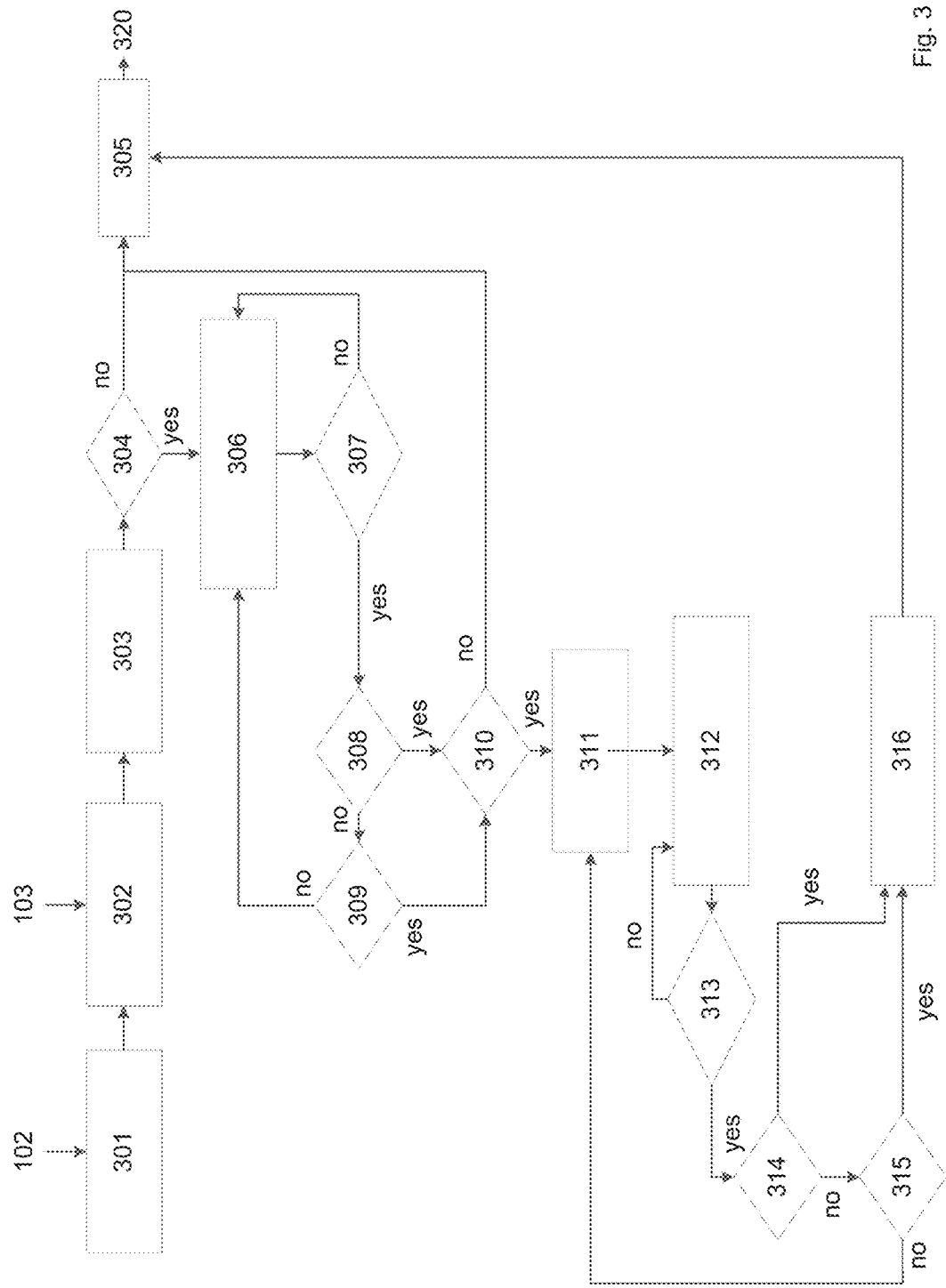

SYSTEMS AND METHODS FOR EXTRACTING AND MATCHING DESCRIPTORS FROM DATA STRUCTURES DESCRIBING AN IMAGE SEQUENCE

CROSS REFERENCE TO RELATED APPLICATIONS

The present invention claims priority to European Application No. 16167518.6, filed Apr. 28, 2016, the disclosure of which is hereby incorporated by reference in its entirety.

FIELD OF THE INVENTION

The invention relates to the field of video analysis, in particular to a data structure providing an image sequence descriptor, used for describing an image sequence, as well as a method for extracting such a descriptor from a digital image sequence, and a method for matching a descriptor of this type against one or a set of descriptors of the same type or compatible still image descriptors.

BACKGROUND

Methods are known for the extraction of compact descriptors from still images, which methods include filtering local interest point descriptors, aggregating them to global descriptors and compressing descriptors by means such as dimensionality reductions and binarisation. Examples of such methods are:
Fisher Vectors, as described by: F. Perronnin and C. Dance: Fisher kernels on visual vocabularies for image categorization. In IEEE Conference on Computer Vision and Pattern Recognition, pages 1-8, June 2007;
Scalable Compressed Fisher Vectors (SCFV), as described by: J. Lin, L.-Y. Duan, T. Huang, and W. Gao: Robust Fisher codes for large scale image retrieval. In IEEE International Conference on Acoustics, Speech and Signal Processing, pages 1513-1517, May 2013;
VLAD and its improvements, as described by: H. Jegou, M. Douze, C. Schmid, and P. Perez: Aggregating local descriptors into a compact image representation. In IEEE Conference on Computer Vision and Pattern Recognition, pages 3304-3311, June 2010; and R. Arandjelovic and A. Zisserman: All about VLAD. In IEEE Conference on Computer Vision and Pattern Recognition (CVPR), pages 1578-1585, June 2013;
VLAT, as described by: D. Picard and P.-H. Gosselin: Improving image similarity with vectors of locally aggregated tensors. In IEEE International Conference on Image Processing, Brussels, BE, September 2011;
CDVS, which are defined in ISO/IEC 15938-13, Information technology—multimedia content description interface—Part 13: Compact descriptors for visual search, 2014.
WO 2015/011185 A1, describing ALP ("A Low-degree Polynomial"), a method for detecting interesting points in an image,
WO 2013/102574 A1, describing a method for extracting, representing and matching local and global descriptors of still images,
WO 2010/055399 A1, a method and apparatus for representing and identifying feature descriptors utilizing a compressed histogram of gradients,
WO 2013/076365 A1, describing a method for detecting interest points as minima and/or maxima of filtered images and extracting descriptors for these interest points, and U.S. Pat. No. 9,131,163 describes a method for coding and compressing 3D surface descriptors.

All of the mentioned methods address compact representation of descriptors of still images, but do not make of use the temporal redundancy of descriptors extracted from an image sequence in order to achieve better compression and reduce the computational complexity of comparing descriptors of two image sequences.

For video data, EP 1147655 B1 describes a system and method for the description of videos based on contained objects and their relations. While being able to describe video content in a semantic form, the method cannot be applied for efficient visual matching, where extraction of actual objects cannot be applied due to complexity and computational costs.

WO 2009/129243 A1 describes methods and systems for representation and matching of video content. The method aims at spatially and temporally aligning segments of video rather than determining a numeric value of their similarity. While performing selection of features, the method of WO 2009/129243 A1 does not encode the features in a compressed way. In addition, time and space coordinates are discarded, thus not allowing for spatiotemporal localisation.

A common problem in applications processing and managing image sequences (e.g., video databases) is to determine the similarity of image sequences based on the visual similarity of foreground or background objects visible in all or a temporal segment of the image sequence. Generally, the analysis of image sequences is significantly different from video copy detection, for which a number of approaches exist (e.g. in U.S. Pat. No. 7,532,804), and will require a different approach. Moreover, additional intricacies may arise in this context in cases where the objects used for determining similarity are visible only in a spatial, temporal or spatiotemporal segment of the image sequence, where objects are depicted from different views and under different conditions, and/or where image formation and processing may have been different. Therefore, it is one objective of the invention to provide a way for analyzing and describing an image sequence, in particular video sequences, by a descriptor type which is compact and allows matching of two descriptors with little computational complexity, while being applicable to image sequences regardless of the type of encoding and bitrates.

SUMMARY OF THE INVENTION

The mentioned objective is achieved by a data structure, a method for describing an image sequence, as well as a method for determining a scalar distance value between two image sequence descriptors ("matching method"), according to the appended independent claims. The dependent claims describe further optional features representing advantageous developments of the invention.

According to a first aspect of the invention, a data structure for describing an image sequence (or segment thereof) containing a plurality of images in a predetermined order, said data structure including an image sequence descriptor comprising:
a base descriptor, said base descriptor representing a global descriptor associated with a specific image of the image sequence, referred to as representative frame, and
a number of relative descriptors relating to global descriptors associated with images in the segment, each of said relative descriptors containing information of a respective global descriptor relative to the base descriptor allowing to reconstruct a global descriptor associated with a respective image of the image sequence from the relative descriptor and the base descriptor, The reconstruction of the global descriptors will generally allow an exact or approximate recovery of the original global descriptor data, depending on the detail of the implementation.

The global descriptors are associated with respective images of the image sequence (or segment thereof), and each global descriptor contains aggregated information relating to interest points within the video content of the respective image.

The invention provides an efficient format for describing the visual information in image sequences, which is more compact than prior art which treats single images independently. This does not only reduce the memory space needed to store descriptors of an image sequence, but it also reduces the computational complexity of matching the descriptors of two image sequences. This type of descriptor is extracted from local and/or global descriptors, using a method for local descriptor extraction from interest points of a single image and a method for aggregation of such descriptors to a global descriptor for a single image, but is agnostic of the specific type of local descriptor extractions and aggregation method.

In this disclosure, the term "interest point" refers to a well-established concept in the field of video analysis (as introduced in C. Schmid and H. Mohr, "Local Grayvalue Invariants for Image Retrieval", IEEE PAMI, 19 (5), pp. 530-534, 1997, https://hal.inria.fr/inria-00548358); generally, an interest point can be understood as a location of a feature in an image which represents a place of high local information density, such as a corner or other special structure, and which is stable under transformations of the image. Furthermore, "aggregation" of descriptors designates a process for combining a number of descriptors which preferably goes beyond simple grouping of the descriptors into a set of descriptors, resulting in a smaller descriptor than one formed by simple grouping. Examples of aggregation processes are the one for bag of features described in the article "Packing bag-of-features" by H. Jegou et al., Proc. ICCV, 2009 (https://hal.inria.fr/inria-00394213), or the mentioned process for forming VLAD descriptors.

The data structure may also refer to a part or a segment of an image sequence a segmented image sequence. In this case, the image sequence descriptor may advantageously comprise, for each of a number of segments within the image sequence, a segment global descriptor which includes a base descriptor and relative descriptors (e.g. differential descriptors) associated with images of the respective segment. The number of segments may be two or more. A non-segmented image sequence can be considered as one segment which comprises the entire image sequence.

In a preferred development of the invention, the relative descriptors may be "differential" descriptors, in that they contain an encoded difference between the respective global descriptor and the base global descriptor, wherein the difference is determined using a predefined difference function. For instance, the representative frame may be a medoid frame among the images of the respective segment.

For the coding of the global descriptors, any suitable method may be used, and preferably, a method representing a global descriptor as a vector and defining a metric for comparing such vectors. For instance, the descriptors may be coded according to any method chosen from the group comprising: Fisher Vectors, SCFV, CDVS, VLAD, VLAT, features obtained from layers of trained Deep Convolutional Neural Networks (for example as described in J. Donahue et al., "DeCAF: A Deep Convolutional Activation Feature for Generic Visual Recognition", Proc. ICML, 2014, https://arxiv.org/pdf/1310.1531.pdf) or combinations thereof. Herein, the term VLAD is to be understood as also including any known variant of VLAD.

The data structure may also include local descriptors (also referred to as local feature descriptors). In particular, the image sequence descriptor may comprise, for each of a number of segments within the image sequence (in the case of a segmented image sequence) or for the image sequence as such, a segment local descriptor, said segment local descriptor comprising a set of encoded local feature descriptors. Any suitable known method for interest point detection and extraction of descriptors from a region around those interest points may be used for determining local feature descriptors. For instance, they may be coded according to any method chosen from the group comprising: CDVS, SIFT, SURF, ORB, features obtained from layers of trained Deep Convolutional Neural Networks or combinations thereof.

The data structure may also comprise other data describing the underlying video sequence. Preferably in this context, the image sequence descriptor may further comprise one or more of the following data:

data indicating (exact or approximated) relative temporal positions of the images with which the global descriptors are associated, data indicating (exact or approximated) relative temporal positions of images with which local descriptors are associated, data indicating (exact or approximated) spatial positions of features in images to which local descriptors refer, and data representing relevance information of global descriptors and/or local descriptors.

Another aspect of the invention is directed at a method for describing an image sequence, said image sequence containing a plurality of images in a predetermined order. This method includes the steps of detecting interest points in each image, extracting local features from each image, aggregating local features in each image to form a global descriptor of each image, as well as the following steps (which are performed for the entire image sequence or for one segment of the image sequence, or for several or all segments):

selecting a representative frame, choosing the global descriptor associated with the representative frame as a base descriptor for the segment, determining relative descriptors from global descriptors associated with images in the segment, each of said relative descriptors containing information of a respective global descriptor relative to the base descriptor, and generating an image sequence descriptor by encoding the base descriptor and relative descriptors.

As already mentioned, the descriptor extraction method uses a method for local descriptor extraction from interest points of a single image and a method for aggregation of such descriptors to a global descriptor for a single image, but is agnostic of the specific type of local descriptor extractions and aggregation method. Moreover, the method may, advantageously, apply temporal subsampling and lossless or lossy compression of the global and local descriptors in the sequence, for instance by selecting a frame as the medoid of the segment and representing global and local descriptors of other frames as differences to the respective descriptors of the medoid. The said descriptor extraction method can be parameterised for different target descriptor bitrates.

Where the image sequence is to be segmented, for instance in the case where the image sequence is long and/or contains heterogeneous visual content, it may be advantageous to include segmenting the image sequence, namely by dividing the image sequence into a number of mutually disjoint segments based on the global descriptors of the images, each segment comprising a number of consecutive images from the image sequence.

In a preferred development of the invention, the representative frame may be chosen as a medoid frame among the images of the respective segment based on a predefined distance function on global descriptors of images, and/or the relative descriptors may be determined by encoding the difference between the respective global descriptor and the base global descriptor, wherein the difference is determined using a predefined difference function.

As one advantageous approach to reduce the size of the data structure obtained during the determination of relative descriptors, it is possible to omit (or remove) descriptors that correspond to a difference smaller than a predetermined threshold value $\theta_g$. The relative descriptors may be encoded using an entropy coding method.

The method according to this aspect of the invention may also include applying filtering, aggregation and compression of local features to obtain a set of local feature descriptors and/or including filtering, aggregation and compression of the global descriptors, so the step of generating an image sequence descriptor will also include encoding the local feature descriptors into the image sequence descriptor. During the step of applying filtering, aggregation and compression of local features, it may be advantageous if the set of local feature descriptors is filtered to exclude all local feature descriptors that are more similar to any of the local descriptors already encoded, with regard to a predetermined similarity function and a predetermined threshold $\theta_l$ of similarity, and for each of the remaining local feature descriptors, the difference to the most similar of the local feature descriptors already encoded is determined and the difference thus obtained is encoded using an entropy coding method.

As another approach to control the size of the data structure, it is possible to predefine a maximum size, and the threshold value is controlled so as to adjust the size of the resulting image sequence descriptor to fall below the maximum size.

The extracting method may be done for all images of the image sequence, or for a (regularly or irregularly) sampled subset of the images in the image sequence. The images in the input (i.e., in the image sequence or the sampled subset) are processed in temporal order or in the order of a value yielded by a function of a counter of the images in the input.

The resulting image sequence descriptor may be serialised (i.e., coded into a linear sequence of data/symbols) and transferred to a bitstream, or file, or a database, such as a database of video descriptors. The data structure, or the bitstream/file/database made from it, may be stored on any data storage medium of known type. The data structure may be stored separately from the original images sequence (such as a video file or video stream), or together with it, for instance the data structure is inserted or appended to the original image sequence, or combined into a complex data file.

A further aspect of the invention is directed at methods for operating with or processing video sequences. For instance, it may be desired to operate with image sequences by matching the corresponding image sequence descriptors, and/or a method for retrieving an image sequence from a given set of image sequences, for instance in order to find a most similar sequence with respect to a given video portion. This involves a comparison ("matching") of image sequence descriptors, in order to obtain a matching measure describing the similarity of the image sequences involved. Thus, a method for matching two image sequence descriptors of the above-described type is proposed, where a scalar distance value between the image sequence descriptors is determined, preferably by performing a distance calculation between the base descriptors of the image sequence descriptors and between global descriptors of either image sequence descriptors. The global descriptors used in the distance calculation are retrieved or reconstructed by a suitable method disclosed herein. Advantageously, the distance calculation may be performed from coarse to fine temporal resolution for efficiency of the calculation. Following a coarse to fine matching paradigm allows to terminate matching of dissimilar descriptors as early as possible. In particular, the matching method may include that said global descriptors are reconstructed until a number of global descriptors is reached which is precalculated from the length of the image sequences underlying the image sequence descriptors.

This matching of descriptors is suitable for use in methods for matching and/or retrieval of image sequences. For instance, a method for retrieving from a set of image sequences, e.g. based on a given reference image sequence, will comprise obtaining an image sequence descriptor relating to the reference image sequence (e.g. by reading/loading the descriptor from an input such as a storage device or extracting it from the image sequence) and comparing said image sequence descriptor with image sequence descriptors relating to the image sequences of the set (again, these descriptors may be obtained by reading/loading them from suitable input or storage, such as a database, or calculated from the image sequences). The result(s) of this matching will give information that can be used in, e.g., identifying and/or retrieving the image sequence which is most similar to the first image sequence. In particular, the results thus obtained may be used to obtain a retrieval measure, and/or an image sequence descriptor that represents a best match within the set, and/or identifying the image sequence which is the best match within the set.

For the entire matching process, the number of descriptor pairs to be matched will be of quadratic order. Instead of matching independent descriptors of still images, the matching method of the invention reduces the number of descriptors to one per segment. In the best case, the time needed to match a pair of segment descriptors extracted by the method of the invention is the same as for matching (only) a pair of still image descriptors of methods in prior art. The matching method of the invention has the advantage that the matching time is also significantly lower than the matching time of still image descriptors, even in less favourable cases.

The extracting, matching and retrieving methods according to the invention may be realised as a computer program, to be executed on any suitable data processing system. In this context, a data storage medium comprising computer program instructions for carrying out the method according to the invention may be used to distribute the invention.

A further aspect of the invention is a system capable of performing the methods of descriptor extraction, matching, and/or retrieval. In general, a system for processing image sequence descriptors of the kind as disclosed herein will include at least one module configured for performing one or more of the descriptor-processing methods described above; further modules for input, output, storing, etc., may be included as will be suitable. In particular embodiments, a system for image sequence description will comprise at least an image sequence input module, a descriptor extraction module, and an output module, wherein the descriptor extraction module implements an extraction method as described herein. A system for image sequence matching or retrieval, will comprise a storage device, at least two instances of an input module for reading descriptors from a storage device, a memory for storing descriptors, a descriptor matching module and a reporting module for outputting matching or retrieval results, wherein the descriptor matching module implements a matching method as described herein; in this system, it is also possible that one or all of the input modules are replaced by a subsystem corresponding to a system for image sequence description as mentioned before.

The invention enables to describe the visual information in image sequences more compactly than prior art which treats single images independently. This does not only reduce the memory space needed to store descriptors of an image sequence, but it also reduces the computational complexity of matching the descriptors of two image sequences. The mentioned properties of the invention enable building matching and retrieval systems handling larger sets of image sequences more efficiently, including applications in media archives, video production and distribution and law enforcement. Typical problems from these applications addressed by the invention include finding image sequences with temporal segments showing the same or similar background scenes or salient objects, possibly from different viewpoints, under different lighting conditions and depicted with different size, resolution and/or using different sensors or encodings.

BRIEF DESCRIPTION OF THE DRAWINGS

These and other features and advantages of the present invention will be made evident by the following description of some exemplary and non-limitative embodiments thereof, to be read in conjunction with the attached drawings, wherein:

FIG. 3 shows a flowchart of a method according to an embodiment of the invention, for matching descriptors of the type as illustrated in FIGS. 1-1c;

DETAILED DESCRIPTION OF THE INVENTION

Figure 1:
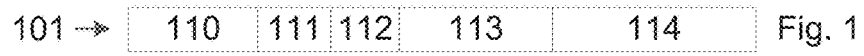
FIG. 1 shows a schematic depiction of the structure an image sequence descriptor according to an embodiment of the invention.

In the following, a descriptor according to a preferred embodiment of the invention is discussed. First, the format of the descriptor is discussed, and then methods for extracting and matching descriptors are described. Herein, a "video file" or "video sequence" is understood as data (usually stored on a data carrier such as a hard disk, DVD or digital magnetic tape) including a sequence of images; in the following, no difference is made between a video sequence and the corresponding image sequence, unless expressly noted otherwise. Further, "to extract" or "extracting" a descriptor (or other information) from initial data (such as a video sequence) is understood as referring to the actions for determining/calculating the descriptor (or other information) from the initial data without affecting the latter, and the descriptor thus extracted may contain data elements copied from the initial data and/or data elements generated based on the initial data. Further, "to match" or "matching" descriptors is understood as referring to the action of comparing the descriptors so as to derive a measure (such as score value) describing the similarity of the descriptors or underlying initial data. With regard to an image sequence, the terms "image" and "frame" are used herein interchangeably. A "segment" of a sequence of images (or video sequence) is understood, except where denoted explicitly otherwise, as the entire sequence or a part thereof, with a segment representing a set of frames which spans the interval between the first and last image of the segment, without any other segment or segment portion occurring within this interval; often, a segment is additionally required to represent a temporally continuous sequence of frames between the specified first and last image of the segment. It will be evident to the person skilled in the art to freely combine several or all of the embodiments discussed here and/or several or all of the appended claims as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required.

Descriptor Notations

In the description that follows, the following general abbreviations and notations are used. A video sequence (or more generally, an image sequence) is given as $\mathcal{I}=\{I_1, \ldots, I_N\}$, the sequence of images in the video. In case the video is segmented, $\mathcal{S}=\{S_1, \ldots, S_K\}$ is the set of segments of the video, with $S_k=\{I_1^k, \ldots, I_{M_k}^k\}$ being the set of images of the segment k of length $M_k$. A segment is only characterised by visual similarity and only continuous changes between subsequent frames, but does not necessarily coincide with a semantic unit of the video. However, in practice, a segment is likely to be a shot or subshot. In the case the video sequence is not segmented, the video is regarded as representing one segment, $\mathcal{I}=S_1$.

In the following, the index m of an image $I_m^k$ (within the respective segment $S_k$) may be used as a shorthand for the image itself. In an image $I_m^k$, a set of interest points $P^m=\{p_1^m, \ldots, p_n^m\}$ is detected, for instance using a known detection method such as DoG (Difference of Gaussian), ALP or Hessian Affine. Further, $D^m=\{d_1^m, \ldots, d_n^m\}$ denotes a corresponding set of descriptors of the surrounding region of the interest point, called "local descriptors"; such local descriptors are extracted using a known method for feature detection such as SIFT, SURF or ORB (see E. Rublee, V. Rabaud, K. Konolige and G. Bradski, "ORB: An efficient alternative to SIFT or SURF", 2011 International Conference on Computer Vision, Barcelona, 2011, pp. 2564-2571). A "global descriptor" of a frame of index m is denoted as $G^m$; and the global descriptor is obtained from aggregating the local descriptors in $D^m$ using a known aggregating method. Suitable methods for aggregating descriptors include Fisher Vectors (FV), SCFV, VLAD or VLAT. Derivation of global and/or local descriptors may be also achieved by using layers of trained Deep Convolutional Neural Networks. Furthermore, $G_0^m$ denotes an encoded version of $G^m$, such as after dimension reduction. For instance, $G_0^m$ may be formed such that it only contains the values for the non-zero components of the descriptor and starts with an index indicating the components being present. If the method chosen for descriptor aggregation already yields a binary descriptor, then it may be sufficient to have $G_0^m = G^m$. The notation $\overline{d_1^m}$ is used to denote an encoded version of the local descriptor $d_1^m$, e.g., as defined by the local descriptor encoding in ISO/IEC 15938-13.

Image Sequence Descriptor

The invention offers a method for extracting a single descriptor from a temporal segment, i.e., a set of consecutive and related frames (e.g., a shot) of an image sequence. This type of descriptor is created from an aggregation of sets of local descriptors from each of the images in the segment, and contains an aggregation of global descriptors and, optionally, a set of the extracted local descriptors, together with their time and location.

FIG. 1 shows a schematic depiction of the structure of an image sequence descriptor 101, which has been extracted for a segment $S_k$ according to the embodiment of the invention. The descriptor 101 comprises a segment global descriptor 113, denoted $\mathcal{G}_{S_k}$, and may further comprise a local part or segment local descriptor 114; thus, the descriptor 101 may be stated as $\mathcal{D}_{S_k} = (\mathcal{G}_{S_k}, \mathcal{L}_{S_k})$. The descriptor 101 may also comprise a header structure 110, which states the version/type of the descriptor, length of the descriptor and/or number of components contained. The descriptor may advantageously also contain data to describe the underlying segment, such as a segment start time 111 and a segment end time 112, and/or the number of frames contained (not shown).

Figure 1A:
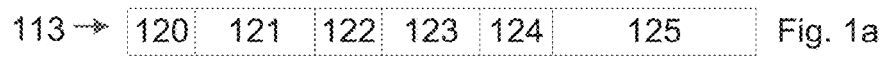
FIG. 1a shows the structure of a segment global descriptor representing a component of the descriptor shown in FIG. 1.

The segment global descriptor 113, illustrated in FIG. 1a, contains information of global descriptors, for instance in the form $\mathcal{G}_{S_k} = (G_0^{\tilde{m}}, \{\Delta_G^j | j \in I^k, j \neq \tilde{m}\})$. This structure includes one "base descriptor", which is the descriptor $G_0^{\tilde{m}}$ of a "representative frame" (whose index is denoted by a symbol with tilde, such as $\tilde{m}$, and which is selected as described in detail below), and a set of descriptors $\Delta_G^j$ for all or a subset of the other frames in the segment. $\Delta_G^j$ is calculated as $\text{enc}(G_0^j \oplus G_0^{\tilde{m}})$, with enc( ) being a suitable coding such as the encoding defined below. For instance, the segment global descriptor 113 may include a component 120 containing the index ñ of the representative frame, the base descriptor 121, a component 122 containing the number of frames described in the descriptor 113 and their relative temporal positions 123, a block 125 (coded global descriptors block) which holds the set of encoded descriptors $\Delta_G^j$ relating to coded global descriptors other than the base descriptor, and the size 124 of the coded global descriptors block.

Figure 1B:
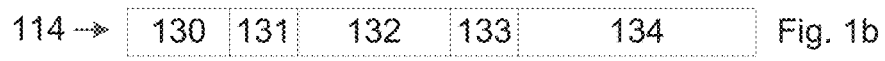
FIG. 1b shows the structure of a segment descriptor local part representing a component of the descriptor shown in FIG. 1.

Furthermore, referring to FIG. 1b, the descriptor 101 may contain a local part 114, which preferably contains a structure corresponding to $\mathcal{L}_{S_k} = (T, f_{\tilde{m}}, \overline{\Delta}, \{\lambda_j\})$. The local part comprises a coded local descriptor block 132 which contains the encoded local descriptors $f_{\tilde{m}}$ of the representative frame and differentially encoded descriptors of other frames $\overline{\Delta}$. The local part may preferably also include a component 130 stating the number of local descriptors in the segment, the size 131 of the coded local descriptor block. The local part may further comprise a structure 134 (coded keypoint location block) containing the set of encoded locations of the descriptors $\lambda_j$ in each of the frames j, as well as the size 133 of the structure 134.

Figure 1C:
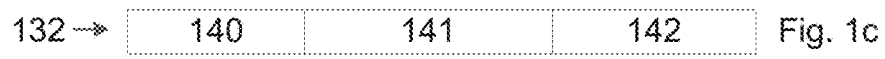
FIG. 1c shows the structure of a coded local descriptor block representing a component of the structure of FIG. 1b.

As illustrated in FIG. 1c, the coded local descriptor block 132 may comprise the local descriptors $f_{\tilde{m}}$ in a component 141. It may further include a time map T (component 140) indicating the presence (time) of descriptors in the frames of the segments, and/or a (sub)set $\overline{\Delta}$ of local descriptors of other frames (in component 142), which are encoded as the differences of the feature descriptors in component 141.

Summarising, a compact image sequence descriptor according to the invention, which can be used for describing an image sequence, comprises at least a segment global descriptor 113 for a segment within the sequence, which includes global descriptor information for respective images, relating to interest points within the video content of the images. The segment global descriptor 113 includes a base descriptor 121, which is a global descriptor associated with a representative frame 120 of the image sequence, and a number of relative descriptors 125. The relative descriptors contain information of a respective global descriptor relative to the base descriptor allowing to reconstruct an exact or approximated global descriptor associated with a respective image of the image sequence. The image sequence descriptor 101 may further include a segment local descriptor 114 for the segment, comprising a set of encoded local feature descriptors. The data structure will comprises multiple image sequence descriptors 101 in the case that the image sequence is segmented into multiple segments.

Segment Descriptor Extraction

Figure 2:
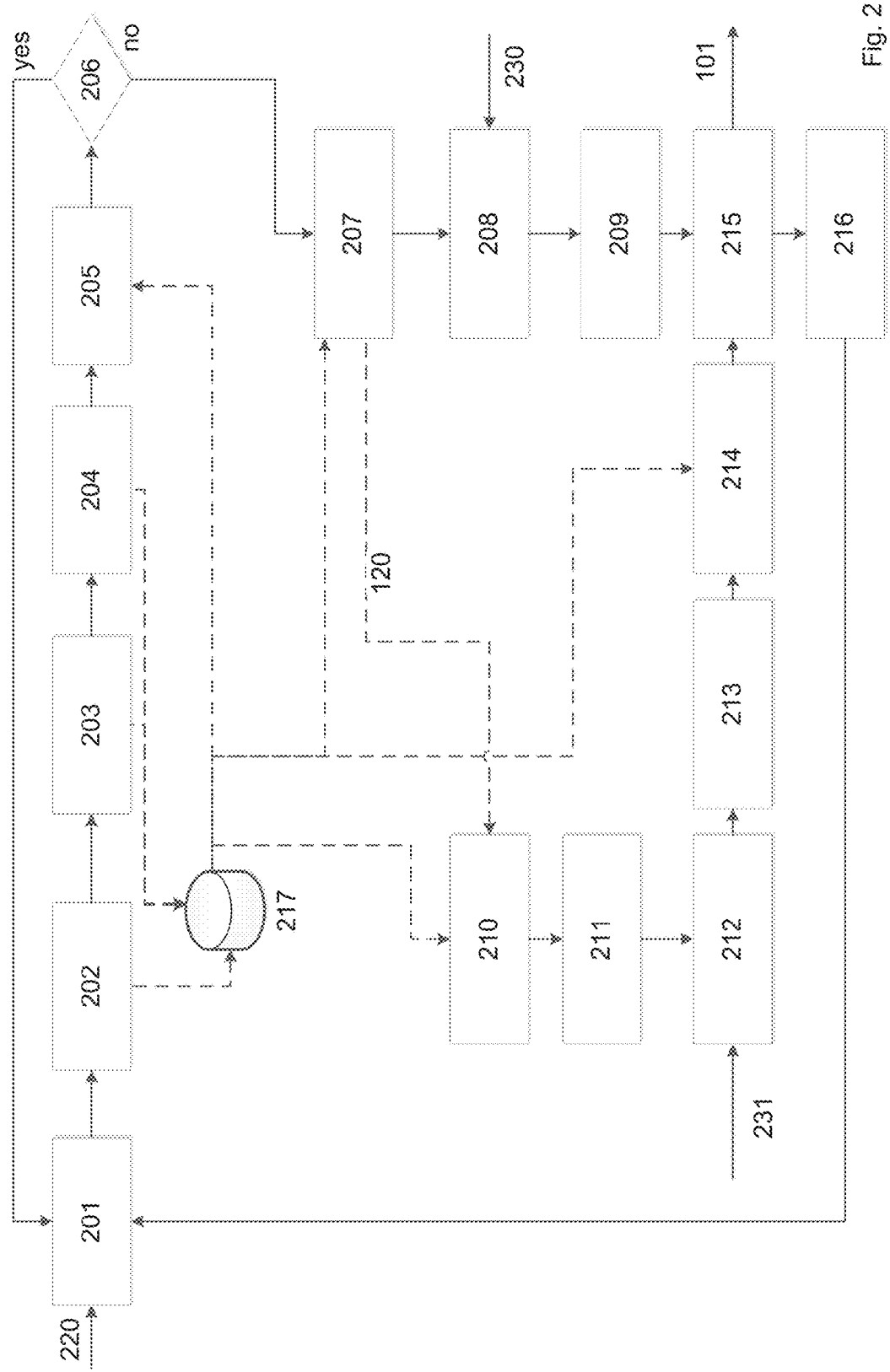
FIG. 2 shows a flowchart of a method according to an embodiment of the invention, for extracting a descriptor of the type as illustrated in FIGS. 1-1c.

FIG. 2 shows a schematic flow diagram of one embodiment of the invention, namely, an exemplary process for extracting an image sequence descriptor 101, also referred to as segment descriptor, from an image sequence in a video, supplied as input 220. The extraction can be performed from all or a subset of frames of the image sequence 220; for instance, a subset may be formed (not shown in FIG. 2) by regular subsampling of the image sequence by a factor $f_s$. Setting $f_s = 1$ will process all images of the sequence, higher values will skip some frames. In most cases, $f_s$ will be chosen between 2 and 10. Clearly, this parameter impacts the size of the resulting descriptor and determines the upper boundary of the temporal localisation precision of the descriptor. An additional input parameter is the average upper boundary of the descriptor size $S_{max}$, typically expressed in relation to its length of duration (e.g., in kilobytes per second of video). An upper boundary for $S_{max}$ is the size of the encoded image sequence (also expressed as bitrate), and typical values are in the range of 4 kB/s to 32 kB/s.

A first stage is temporal segmentation of the video in visually homogeneous segments, in steps 201-206. For every frame $I^m$ of the input sequence starting from an initial frame $\hat{\imath}$ (step 201), interest points $P^m$ are detected (step 202), local descriptors $D^m$ are extracted (step 203) and aggregated to a global descriptor $G^m$ (step 204).

In step 205, (optional) temporal segmentation is performed. Using the similarity of the extracted global descriptor based on matching global descriptors of current and previous images, the segmentation is made by, e.g., defining a segment as starting from frame $\hat{i}$ according to $$S_k = \{I_i | \delta_g(G_i, G_{i-1}) \leq \theta_g \wedge I_{i-1} \in S_k, i = \hat{i} \ldots \infty\},$$

where $\delta_g$ is an appropriate distance function for global descriptors (e.g., a L1 or L2 norm defined on the vector representation, or a Hamming distance), and $\theta_g$ is a threshold chosen for the desired temporal segmentation properties. Thus, the segment will include all frames starting from frame $\hat{i}$ until the "dissimilarity" (as measured by $\delta_g$) between to subsequent frames exceeds the threshold (step 206). The next segment will then start with this frame where the threshold is exceeded, and so on. The choice of $\theta_g$ depends on the type of global descriptors employed; for example, for SCFV with 512 elements values of $\theta_g$ in the range of 480-500 were found to yield good results. Smaller values will yield more homogenous segments (in terms of visual variations) with shorter duration, but more compact descriptors for these segments.

Once segments are identified, the descriptor for a segment is encoded by aggregating global descriptors (steps 207-209) and (optionally) coding local descriptors (steps 210-214) of the segments, in subsequent stages described in the following two subsections.

Segment Global Descriptor

From the set of global descriptors $G^m$, $m \in S_k$ (as defined in step 204), in step 207 the pairwise distances $\delta_g(G^m, G^n)$ are determined for all index pairs m,n, and the medoid frame 120 is selected as a representative frame, for instance according to $$\tilde{m} = \mathrm{argmin}_j \sum_i \delta_g(G^i, G^j),$$

This frame is the one which is "overall most similar" to all frames of the segment. The corresponding descriptor 121 is denoted $G_0^{\tilde{m}}$. For the other sampled frames $i \neq \tilde{m} \in S_k$, in step 209 a relative descriptor is determined, for instance by differential coding and arithmetic encoding of global descriptors: The relative quantities $\overline{\Delta}_G{}^i = G_0^i \oplus G_0^{\tilde{m}}$ are determined, i.e. the bit-wise differences of the binarised global descriptors. The rationale is to obtain descriptors of the same size, but with a lower number of bits set. Then, encoding of the difference descriptors is applied, yielding $\Delta_G{}^i = \mathrm{enc}(\overline{\Delta}_G{}^i)$ (in the coded descriptor block 125). The function enc( ) is implemented as adaptive binary arithmetic encoding (as described in W. B. Pennebaker, J. L. Mitchell, G. G. Langdon & R. B. Arps: "An Overview of the Basic Principles of the Q-Coder Adaptive Binary Arithmetic Coder", IBM J. Res. Develop. 32, pp. 717-726, 1988).

Before step 209, it is possible to insert filtering 208 of the descriptors, based on the descriptor size $S_{max}$ mentioned above, which is accepted in this step 208 as a parameter 230 describing the bit budget for global descriptors. Depending on the choice of $S_{max}$, all or only a subset of the descriptors is included in the descriptor for the segment. In case descriptors need to be removed, they are removed by ascending values of $\delta_g(G^i, G^{\tilde{m}})$, i.e. descriptors more similar to the medoid descriptor are removed first, until their encoded size is sufficiently small to meet (or fall below) the target size $S_{max}$. The remaining number of difference descriptors is denoted $K_g$. In the minimum case that $K_g = 0$, the resulting global descriptor consists only of the medoid descriptor. For segments with average visual variability (i.e., neither static nor very dynamic), there are typically 3-7 remaining descriptors. The encoded descriptors may be written in the resulting segment global descriptor in any order that is preferred; suitably, they are output in the following order which will facilitate matching of image sequence descriptors:

$$[G_0^{\tilde{m}}, \Gamma_0, \ldots, \Gamma_{K_g}], \text{ where}$$

$$\Gamma_i = \begin{cases} \Delta_G^{k_0}, k_0 = \mathrm{argmax}_k \delta_g(G^k, G^{\tilde{m}}), & \text{if } i = 0 \\ \Delta_G^{k_i}, k_i = \mathrm{argmax}_k \delta_g(G^k, G^{k_{i-1}}), & \text{otherwise} \\ G^k \notin \{G^{k_0}, \ldots, G^{k_{i-1}}\}, & \end{cases}$$

Segment Local Descriptor

The image sequence descriptor according to the invention may also include local feature descriptors, coded in a segment local descriptor. The construction of the segment local descriptor of the embodiment illustrated in FIG. 2 is done as follows.

Starting with step 210, local descriptors are determined. For each of the frames feature selection is performed as defined in the encoding process for $\overline{d_i^m}$ but encoding is not yet performed.

Each local descriptor has been extracted around an interest point (x,y). Some local descriptor extraction methods also provide a selection priority $\pi$, expressing the confidence in the interest point (higher values corresponding to higher confidence). Each of these selected descriptors $d_i^m = \{x, y, \pi, f\}$ is thus a tuple of interest point location, selection priority (optional, set to 0 for all points if not extracted) and the local feature descriptor f. Pairwise distances of the local descriptors are calculated in step 211, and in step 212 filtering and approximating of local descriptors is made. Starting from the medoid frame 120 $\tilde{m}$, the sufficiently dissimilar local descriptors are collected (step 212) according to:

$$L = \{d_i^m | d_1(d_i^m, d_j^n) \geq \theta_l; \forall i, j;$$

$$m = \tilde{m}, \tilde{m}-1, \tilde{m}+1, \ldots; n = \tilde{m}-1, \tilde{m}+1, \ldots\},$$

where $\theta_l$ is a threshold, which is entered as a parameter 231 describing the bit budget for local descriptors. The value of this parameter $\theta_l$ is chosen depending on the intended descriptor size (e.g., up to 5 for CDVS). The notation $\{\tilde{m}-1, \tilde{m}+1, \ldots\}$ is used to denote an order of the index which will comprise alternatingly decreasing and increasing indices, starting from the medoid frame $\tilde{m}$. The selection is based on pairwise distances $d_1(\cdot)$ determined by an appropriate distance function for the type of local descriptor, such as the L1 or L2 norm, in step 211. Processing local descriptors starting from the medoid frame has the advantage that it will have more similar descriptors processed first in most cases.

For descriptors omitted due to high similarity, a reference to the most similar descriptor is kept. This results in a set $F_L$ of local descriptors, referred to as the feature descriptor. For each $l \in F_L$, the set $l_i^T$ of frames $m_i$ in which this (or a very similar) descriptor appears, as well as the interest point location are described as:

$$l_i = (f_i, l_i^T)$$

$$l_i^T = \{(t(m_i), x_{m_i}, y_{m_i})\}$$

The frames are identified by time points $t(m_i)$ relative to the start time of the segment.

In step 213, differential coding and arithmetic encoding of local descriptors is made. For the set of descriptors in $F_L$, the most similar descriptor in $F_L$ is determined, and the feature descriptor is determined as the difference of the encoded descriptors, i.e.

$$\delta_1 = \overline{f_{d_i}} - \overline{f_{d_j}}, \text{ where } j = \operatorname{argmin}_j d_1(f_{d_i}, f_{d_j}).$$

Adaptive binary arithmetic encoding is applied to the difference descriptors $\delta_1$. In step 214, location and time encoding is done, obtaining a counter record containing the frames instances of the local descriptors:

$$T = (\tau_{\tilde{m}}, \tau_{\tilde{m}-1}, \tau_{\tilde{m}+1}, \ldots),$$

$$\tau_i = \sum_{l_q \in F_L} \begin{cases} 1 & \text{if } i \in l_q^T \\ 0 \end{cases}$$

Thus, the differential part of the segment local descriptor is obtained, as $$\overline{\Delta} = \{(j, \operatorname{enc}(\delta_1)), \forall \delta_i\},$$

with j being the index of the descriptor used as basis for difference calculation.

The encoding of interest points locations is preferably performed using function locenc( ). The known function locenc( ) encodes the (approximate) locations of the interest points of the encoded descriptors; it may, for example, be implemented using the histogram based location encoding methods described in ISO/IEC 15938-13 or in WO 2013/102574 A1.

The local part of the segment descriptor is composed of the set of the time map 140 (FIG. 1c), the local descriptors appearing in the medoid frame and the set of encoded local difference descriptors (component 141 of FIG. 1c as described above), and of the locations of all interest points (for instance, in the coded keypoint location block 134, FIG. 1b):

$$(T, f_{\tilde{m}}, \overline{\Delta}, (\operatorname{locenc}(\overline{L_{\tilde{m}}}), \operatorname{locenc}(\overline{L_{\tilde{m}+1}}), \operatorname{locenc}(\overline{L_{\tilde{m}-1}}), \ldots)),$$

where $\overline{L_i}$ is the set of locations of local descriptors present in frame i.

The global and local segment descriptors thus obtained are combined into a segment descriptor (step 215) and, if required, serialised into a linear sequence of data. During the process shown in FIG. 2, the various data generated may be written (permanently or only for buffering) to a storage device 217, serving as a frame store for the current segment. After one segment is finished in this process and a new segment is processed, in step 216 the frame store for the current segment may be cleared in order to save storage space.

The segment descriptors are combined into an image sequence descriptor 101, which describes the segmented image sequence, which is serialised and transferred to output. Alternatively, if preferred, it is possible to output the segment descriptors as separate image sequence descriptors. This extraction process of the invention, of which an embodiment is illustrated in FIG. 2, allows to generate an image sequence descriptor which exploits the inherent similarities of the descriptors in order to reduce the size of the resulting data structure.

Segment Descriptor Matching

FIG. 3 shows a schematic flow diagram of another embodiment of the invention, namely, an exemplary process for matching two image sequence descriptors, which are input as, e.g., bitstreams 102, 103. The process reads the bitstreams (steps 301, 302) and built into descriptors, respectively denoted as A and B in the following. In order to allow for efficient matching, it will be advantageous if matching is performed coarse to fine. With |A|,|B| denoting the respective segment lengths, matching is performed as described below, in order to obtain an output quantity 320 in the form of, e.g., a matching score σ in the range [0;1], which is determined as described below.

Global Medoid Descriptor

In step 303, the global medoid descriptors are matched. This is done, for instance, by determining the similarity $\sigma_g$ of the medoid descriptors $G_0^A$ and $G_0^B$ of the two frames, using a distance function as mentioned above. In step 304, using a threshold $\theta_m$, a check for very similar data structures may be clone: If the similarity $\sigma_g < \theta_m$ is below the threshold (304), σ=0, and matching terminates. The value of the threshold depends on the type of local descriptor; for example for SCFV suitable values are between 3 and 7.

Global Descriptor Matching

Otherwise, the matching process continues with step 306, iterative decoding and matching of global descriptors. The similarity $\sigma_g$ is compared against a second threshold $\theta_\gamma$, with $\theta_\gamma > \theta_m$ (e.g., a suitable $\theta_\gamma$ can be 5-10 for SCFV), and determine the match count $$c^G = \begin{cases} 0, & \sigma_g \leq \theta_\gamma \\ 1, & \text{otherwise} \end{cases}$$

and score $\sigma_0 = \sigma_g c^G$. The process proceeds to incrementally decode global descriptors $G_1^A \ldots G_K^A$ and $G_1^B \ldots G_K^B$, and match them against all global descriptors decoded so far, yielding similarities $\delta_1 \ldots \delta_{KK'/2}$; the match count $c^G$ is increased by one for every $\delta_k > \theta_\gamma$, and $\sigma_k$ is calculated as $$\sigma_k = \frac{1}{c^G} \sum_{p=1}^{k} \begin{cases} \delta_k, & \text{if } \delta_k > \theta_\gamma \\ 0 \end{cases}.$$

A minimum number of $\min(2 + \lfloor \max(|A|,|B|) s_{min} \rfloor, |A|, |B|)$ descriptors are matched (loop of steps 306, 307), with $s_{min}$ being a predefined constant ≤1, typically in the range 0.05-0.20. The constant factor two ensures, in correspondence with the order of relative descriptors as mentioned above, that at least the most dissimilar global descriptors to the medoid global descriptor are matched (if they were encoded in the descriptor). In step 308, it is checked whether the similarity score decreases: As additional global descriptors are more similar to the medoid descriptor, decoding and matching further global descriptors from either of the segment descriptors will stop after having matched the minimum number of frames when it is found that $\sigma_k$ would decrease. If this is the case for both segment descriptors, global matching terminates (branch to step 310). Global matching also terminates (through step 309) if all descriptors of all frames present in the segment descriptor have been matched.

If only global matching is to be performed (step 310), matching terminates; otherwise, the process continues with local matching (steps 311-316).

The score $\sigma^G$ of the global descriptor matching is calculated as follows. If the number of matching frames exceeds $n_{min} = \lceil m_{min} \min(|A|,|B|) \rceil$, with a scaling parameter $m_{min}$ ($0 < m_{min} \leq 1$, preferably $m_{min}$ is chosen in the range 0.05-0.2), then $\sigma^G$ is calculated as median of the $n_{min}$ highest pairwise similarities (preferably, this value is additionally normalised by the maximum similarity for the respective similarity function used); otherwise $\sigma^G$ is set to 0.

Local Descriptor Matching

For matching of the local descriptors (steps 311-316), the process proceeds to decode the temporal index, the local descriptors and (if encoded) their locations, and perform matching of the local descriptors of the frames corresponding to the two medoid local descriptors (step 311), yielding a set of similarities $\sigma_0^L = \{\sigma_{0,0}^L, \ldots, \sigma_{P_{\tilde{m}}^A, P_{\tilde{m}}^B}\}$ for the $P_{\tilde{m}}^A P_{\tilde{m}}^B$ pairs of local descriptors in the two frames (using a known algorithm appropriate for the type of local descriptor being used). If relevance information of local descriptors is available (component 142, FIG. 1c), it may be used to match only descriptors with higher relevance. If location information is encoded in the local descriptors (e.g. in the coded keypoint location block 134), matching may also include spatial verification. As the descriptors are also referenced from other frames, it may be advantageous to store the similarities for later use.

Step 312 is iterative decoding and matching of local descriptors for frames in the segment. Each of the similarities $\sigma_{p,q}^L$ of the medoid descriptors is compared against a threshold $\theta_\lambda$ (which is a predetermined parameter chosen, e.g., around 2.0 for CDVS), and count the matching descriptor pairs. A local match count is initialised, $c^L = 0$. If a minimum number of matching descriptor pairs (typically 4-8 are required) are found (and confirmed by spatial verification, if performed), then the local match count $c^L$ is increased by 1 for each such pair of frames.

The matching of the local descriptors is suitably done in the same sequence as for global descriptors (and with the same number of minimum frames to be matched, this is checked in step 313), and for the corresponding frames, calculating new distances or reusing the already calculated ones. In the same way as for global descriptors, the average similarity is updated from the matching frames, and matching terminates when it is found that the matching score decreases (step 314) or all descriptors of all frames present in the segment descriptor have been matched (step 315). Like for the local descriptors of the medoid frame, the local match count is increased if a minimum number of matching descriptor pairs is found.

If the local match count $c^L$ exceeds $n_{min}$ (as determined above for global descriptor matching), the local matching score $\sigma^L$ is calculated as median of the $n_{min}$ highest pairwise similarities.

In step 316, the global matching score $\sigma^G$ and the local matching score $\sigma^L$ are combined into a total matching score $\sigma$, which is returned in step 305. The total matching score $\sigma$ may be determined according to any suitable method, preferably as a weighted sum (e.g., assigning equal weight to both) of the scores $\sigma^G$ and $\sigma^L$, or as the maximum value, $\max(\sigma^G, \sigma^L)$.

Retrieval

The matching method for descriptors can be used in retrieval of image sequences. For instance, a typical retrieval task is finding, in a set of videos or a video database, the video segment which is the most similar to a given reference image sequence. For the reference, an image sequence descriptor is obtained, e.g. by reading/loading the descriptor from an input such as a storage device; alternatively, the descriptor is extracted directly from the image sequence. This image sequence descriptor is compared (matched) with image sequence descriptors relating to the image sequences of the set (again, these descriptors may be obtained by reading/loading them from suitable input or storage, such as a database, or calculated from the image sequences). This will give a set of matching results (each representing the similarity between the reference image sequence one video segment), of which typically the highest value can be used to identify the most similar video segment.

System for Processing Descriptors

Figure 4:
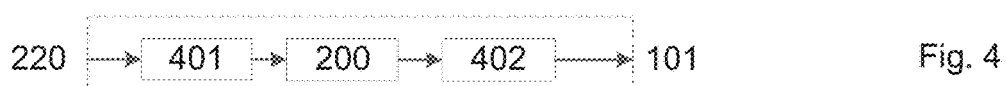
FIG. 4 shows a block diagram of a system for extracting descriptors according to an embodiment the invention.

FIG. 4 illustrates a system 400 for extraction of descriptors of the type as described above. The system contains a component 401 for reading and (if required) decoding the input image sequence 220, a component 200 which is configured to perform the extraction process described according to the invention (see above, e.g. FIG. 2). The descriptors thus calculated are kept in the memory 404 of the system for use in a matching or retrieval operation to be performed subsequently, or are serialised in a storage output module 402 to a storage device.

Figure 5:
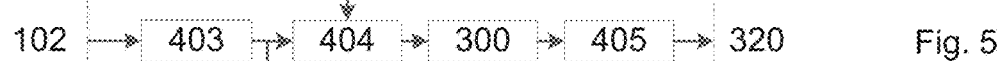
FIG. 5 shows a block diagram of a system for matching two or more of the descriptors according to an embodiment of the invention.

FIG. 5 illustrates a system 500 for matching and/or retrieval of descriptors of the type as described above. For matching of descriptors, two (or more) descriptors 101 are extracted by a subsystem, which corresponds to the system 400 as described with reference to FIG. 4, or input from a storage device 403. They may be buffered in a memory 404, if required. Then, the descriptors are matched in a descriptor matching module 300 performing a matching process according to the invention (see above, e.g. FIG. 3). The matching score 320 obtained from the process is returned through a reporting module 405 as output of the system.

A retrieval of descriptors is done as follows: Descriptors 101 are extracted by a subsystem as described with reference to system 400 and FIG. 4 above, or input from a storage device 403. A first descriptor has the role of a query, and the aim is to obtain a ranked list of the other descriptors in the memory of the system, ordered by similarity to the query descriptor, where this similarity is defined by a matching process as described herein. Furthermore, since performing the matching process (300, FIG. 3) between each pair of descriptors may be inefficient, the implementation of a retrieval subsystem may use an appropriate index data structure to select a subset of descriptor pairs, to which the matching process described in this invention is applied.

Figure 6:
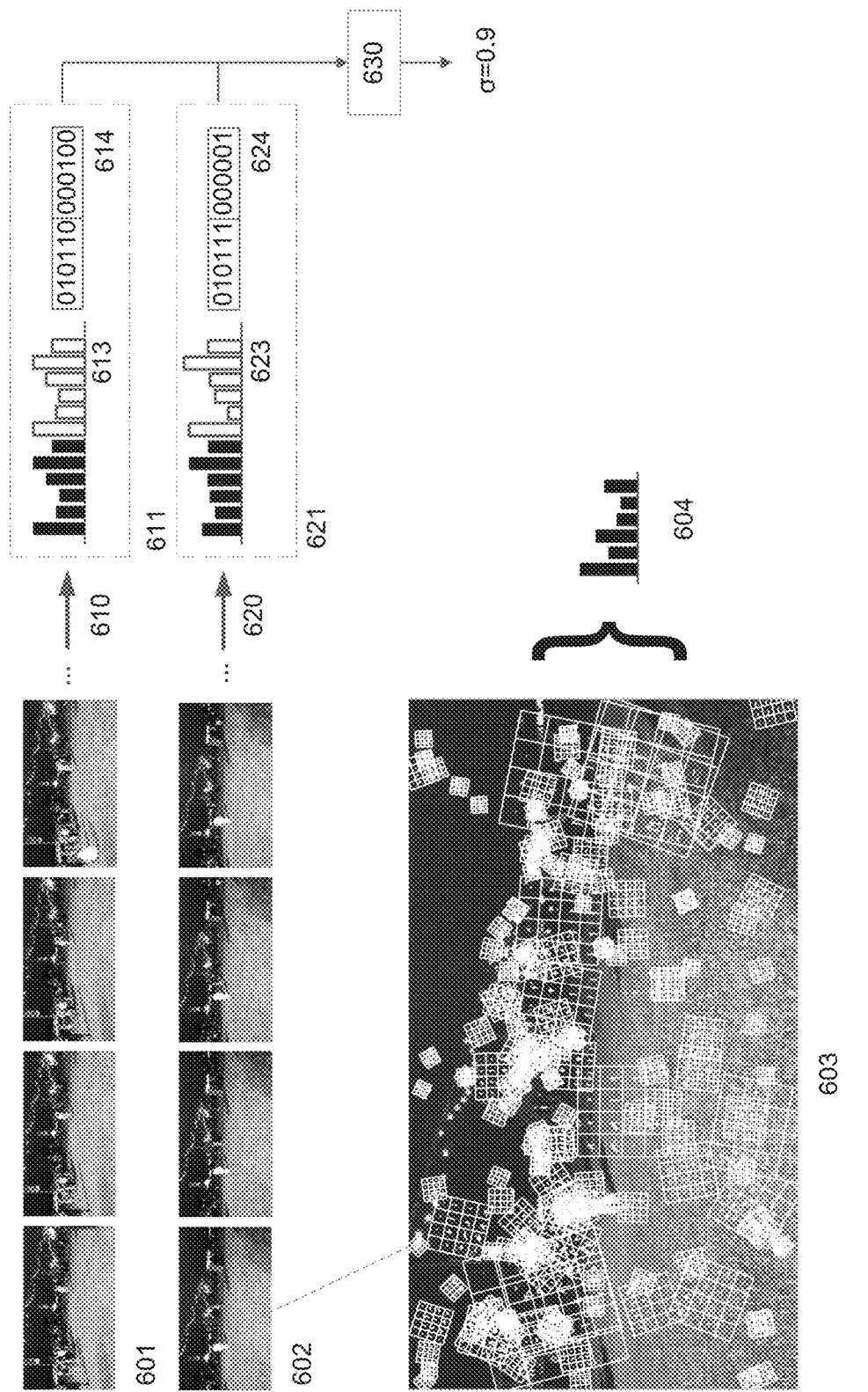
FIG. 6 illustrates descriptor extraction and matching according to the invention for an exemplary set of images from two image sequences depicting the same scenery from slightly different angles at different times.

For an illustration of the above methods and data structures, FIG. 6 illustrates the main stages of extracting and matching image sequence descriptors for two exemplary image sequences. In this example, the two image sequences 601, 602 depict the same scenery from slightly different angles at different times. For each of the two images sequences 601, 602, only the first four of the set of frames contained in the two image sequences are shown. In each frame, interest points are detected, and a local descriptor is extracted from the region around each interest point. The local descriptors represent the image as a set of regions, which may be found in another image in a slightly different spatial configuration, e.g., if objects have moved. This is illustrated in picture 603, which shows the first frame of sequence 602 to which an overlay of location and descriptor regions is added, illustrating local descriptors obtained by detecting interest points by SIFT. The local descriptors of this frame 603 are aggregated to a global descriptor 604, which represents a statistics of the local descriptors in the image (e.g., Fisher Vector or VLAD). The global descriptor thus describes the set of local descriptors found in the image, and images with overall similar components will yield similar global descriptors. Local and global descriptors for each frame in each of the sequences are determined (not shown), and to the descriptors of each of the two image sequences the extraction method as described above is applied (denoted by reference symbols 601 and 620, respectively). This produces a compact image sequence descriptor 611, 621 for each of the image sequences, each including a respective segment global descriptor 613, 623 (represented as the global descriptor of a reference frame and relative global descriptors of other frames) and a respective segment local descriptor 614, 624 (represented as the set of local features of the reference frame and relative local descriptors of the other frames). The image sequence descriptors represent the content of the set of images in each of the sequences, making use of the redundancy in the global and local descriptors of subsequent frames in order to obtain a more compact description. These two image sequence descriptors 611, 621 may then proceed to matching 630. Applying the matching method described above will determine a similarity score from the pair of descriptors 611, 621. In this example, the resulting value is close to 1, such as 0.9, due to the considerable visual similarity of large parts of the image sequences 601, 602.

REFERENCE SIGNS LIST 101 descriptor bitstream
102 first descriptor bitstream to be matched
103 second descriptor bitstream to be matched
110 header structure
111, 112 segment start time and segment end time
113 segment global descriptor
114 segment local descriptor
120 medoid frame number (as reference frame number)
121 medoid global descriptor (as reference global descriptor)
122 number of frames described
123 relative temporal positions of the frames described w.r.t. the start of the segment
124 size of coded global descriptor block
125 coded global descriptor block
130 number of local descriptors in segment
131 size of coded local descriptor block
132 coded local descriptor block
133 size of coded keypoint location block
134 coded keypoint location block
140 descriptor time map
141 local feature descriptors
142 local feature relevances (optional)
200 descriptor extraction module
201 input next frame
202 interest point detection
203 local descriptor extraction
204 local descriptor aggregation
205 matching global descriptors of current and previous image
206 continue current segment
207 determine frame of global reference descriptor
208 filter global descriptors
209 differential coding and arithmetic encoding of global descriptors
210 determine set of local descriptors
211 determine pairwise distances of local descriptors
212 filter and approximate local descriptors
213 differential coding and arithmetic encoding of local descriptors
214 location and time encoding
215 serialisation
216 clear segment store
217 frame store for current segment
220 input image sequence
230, 231 bit budgets for global descriptors/local descriptors
300 descriptor matching module
301 read descriptor A
302 read descriptor B
303 match global (medoid) reference descriptors
304 similarity exceeds threshold
305 return score
306 iterative decoding and matching of global descriptors
307 minimal number of global descriptors matched
308 similarity score decreases
309 all global descriptors matched
310 perform local matching
311 match local descriptors of (medoid) reference frames
312 iterative decoding and matching of local descriptors for frames in the segment
313 minimal number of global descriptors matched
314 similarity score decreases
315 all global descriptors matched
316 combine global and local scores
320 matching score
400 system for extraction of descriptors
401 image sequence input module
402 storage output module
403 storage input module
404 memory
405 reporting module
500 system for matching and/or retrieval of descriptors
601, 602 first and second image sequences
603 frame from second image sequence with local descriptors
604 aggregated global descriptor for the frame
610, 620 extracting segment descriptors for image sequences 601, 602
611, 621 image sequence descriptors
613, 623 segment global descriptors
614, 624 segment local descriptors
630 matching the image sequence descriptors

The invention claimed is:

1. A data structure for describing an image sequence containing a plurality of images in a predetermined order, said data structure including an image sequence descriptor comprising:
a base descriptor, said base descriptor representing a global descriptor associated with a specific image of the image sequence, referred to as representative frame; and
a number of relative descriptors relating to global descriptors associated with images in the image sequence, each of said number of relative descriptors containing information of a respective global descriptor relative to the base descriptor allowing for reconstruction of a global descriptor associated with a respective image of the image sequence from the relative descriptor and the base descriptor,
wherein each of said global descriptors is associated with a respective image of the image sequence and contains aggregated information relating to interest points within video content of the respective image.

2. The data structure of claim 1, wherein the relative descriptors contain an encoded difference between the respective global descriptor and the base global descriptor, wherein the difference is determined using a predefined difference function.

3. The data structure of claim 1, wherein the image sequence descriptor further comprises, for each of a number of segments within the image sequence, a segment local descriptor, said segment local descriptor comprising a set of encoded local feature descriptors.

4. The data structure of claim 1, wherein the image sequence descriptor further comprises data selected from the group consisting of
   data indicating relative temporal positions of the images with which the global descriptors are associated;
   data indicating relative temporal positions of images with which local descriptors are associated;
   data indicating spatial positions of features in images to which local descriptors refer; and
   data representing relevance information of global descriptors and/or local descriptors.

5. The data structure of claim 2, wherein the global descriptors are descriptors coded according to a method selected from the group consisting of Fisher Vectors, SCFV, CDVS, VLAD, VLAT, and features obtained from layers of trained Deep Convolutional Neural Networks.

6. The data structure of claim 3, wherein the local feature descriptors are local descriptors coded according to a method selected from the group consisting of CDVS, SIFT, SURF, ORB, and features obtained from layers of trained Deep Convolutional Neural Networks.

7. A method for describing an image sequence, said image sequence containing a plurality of images in a predetermined order, the method comprising:
   detecting interest points in each image;
   extracting local features from each image, said local features relating to the interest points detected; and
   aggregating said local features in each image to form a global descriptor of each image, wherein the following steps are performed for at least one segment of the image sequence:
   selecting a representative frame, choosing the global descriptor associated with the representative frame as a base descriptor for the segment;
   determining relative descriptors from global descriptors associated with images in the segment, each of said relative descriptors containing information of a respective global descriptor relative to the base descriptor; and
   generating an image sequence descriptor by encoding the base descriptor and relative descriptors.

8. The method of claim 7, further comprising the following step performed for at least one segment of the image sequence:
   generating a segment local descriptor and encoding it into the image sequence descriptor, said segment local descriptor comprising a set of encoded local feature descriptors.

9. The method of claim 7, further comprising segmenting the image sequence by dividing the image sequence into a number of mutually disjoint segments based on the global descriptors of the images, each segment comprising a number of consecutive images from the image sequence.

10. The method of claim 7, wherein in the step of selecting a representative frame, the representative frame is chosen as a medoid frame among the images of the respective segment based on a predefined distance function on global descriptors of images.

11. The method of claim 7, wherein in the step of determining relative descriptors, the relative descriptors are determined by encoding the difference between the respective global descriptor and the base global descriptor, wherein the difference is determined using a predefined difference function.

12. The method of claim 7, wherein during determining relative descriptors, descriptors that correspond to a difference smaller than a predetermined threshold value ($\theta_g$) are omitted, and the remaining relative descriptors are encoded using an entropy coding method.

13. The method of claim 12, wherein a maximum size is predefined and the threshold value is controlled so as to adjust the size of the resulting image sequence descriptor to fall below the maximum size.

14. The method of claim 7, further comprising the step of applying filtering, aggregation and compression of local features to obtain a set of local feature descriptors, wherein during the step of applying filtering, aggregation and compression of local features, the set of local feature descriptors is filtered to exclude all local feature descriptors that are more similar to any of the local descriptors already encoded, with regard to a predetermined similarity function and a predetermined threshold ($\theta_l$) of similarity, and for each of the remaining local feature descriptors, the difference to the most similar of the local feature descriptors already encoded is determined and the difference thus obtained is encoded using an entropy coding method.

15. The method of claim 14, wherein a maximum size is predefined and said threshold is controlled so as to adjust the size of the resulting image sequence descriptor to fall below the maximum size.

16. The method of claim 7, further comprising sampling a subset of images from the image sequence, wherein said subset of images is used as input in place of the images of the image sequence, and wherein the images in the input are processed in temporal order.

17. The method of claim 7, further comprising sampling a subset of images from the image sequence, wherein said subset of images is used as input in place of the images of the image sequence, and wherein the images in the input are processed in the order of a value yielded by a function of a counter of the images in the input.

18. The method of claim 7, wherein the resulting image sequence descriptor is serialized and transferred to a bitstream, file, or database.

19. A method for matching two image sequence descriptors, the method comprising:
   determining a scalar distance value between the two image sequence descriptors by performing a distance calculation between base descriptors of the image sequence descriptors and distance calculations between global descriptors of either image sequence descriptors, wherein the distance calculation is performed from coarse to fine temporal resolution for efficiency of the calculation, wherein said global descriptors are reconstructed until a number of global descriptors is reached which is precalculated from the length of the image sequences underlying the image sequence descriptors.

20. A method for retrieving from a set of image sequences using a reference image sequence, the method comprising;
   obtaining an image sequence descriptor relating to the reference image sequence, matching said image sequence descriptor with image sequence descriptors relating to image sequences from said set using a matching function, and evaluating results thus obtained to obtain at least one of a retrieval measure, an image sequence descriptor that represents a best match within said set, and data identifying an image sequence from the set representing a best match;
   matching two image sequence descriptors by determining a scalar distance value between the two image sequence descriptors by performing a distance calculation between base descriptors of the image sequence descriptors and distance calculations between global descriptors of either image sequence descriptors.

21. The method of claim 20, wherein the distance calculation is performed from coarse to fine temporal resolution for efficiency of the calculation, wherein said global descriptors are reconstructed until a number of global descriptors is reached which is precalculated from the length of the image sequences underlying the image sequence descriptors.

\* \* \* \* \*